United States Patent
Jahn

(10) Patent No.: US 7,350,203 B2
(45) Date of Patent: Mar. 25, 2008

(54) NETWORK SECURITY SOFTWARE

(76) Inventor: Alfred Jahn, 25-10 124th St., Flushing, NY (US) 11354

( * ) Notice: Subject to any disclaimer, the term of this patent is extended or adjusted under 35 U.S.C. 154(b) by 581 days.

(21) Appl. No.: 10/201,430

(22) Filed: Jul. 23, 2002

(65) Prior Publication Data

US 2004/0019803 A1   Jan. 29, 2004

(51) Int. Cl.
   *G06F 9/44* (2006.01)
(52) U.S. Cl. ............... 717/171; 717/175; 713/200; 713/201; 713/202
(58) Field of Classification Search ........ 713/200–201, 713/202; 709/231, 201, 224; 705/14; 707/1; 380/282; 726/25; 717/174, 176, 171, 175; 340/7.26
See application file for complete search history.

(56) References Cited

U.S. PATENT DOCUMENTS

| | | | | |
|---|---|---|---|---|
| 5,369,682 A | * | 11/1994 | Witsaman et al. | 340/7.26 |
| 5,764,897 A | * | 6/1998 | Khalidi | 709/201 |
| 6,185,689 B1 | * | 2/2001 | Todd et al. | 726/25 |
| 6,298,445 B1 | * | 10/2001 | Shostack et al. | 726/25 |
| 6,332,163 B1 | * | 12/2001 | Bowman-Amuah | 709/231 |
| 2003/0056116 A1 | * | 3/2003 | Bunker et al. | 713/201 |
| 2003/0140140 A1 | * | 7/2003 | Lahtinen | 709/224 |
| 2003/0163370 A1 | * | 8/2003 | Chen et al. | 705/14 |
| 2003/0191830 A1 | * | 10/2003 | Fitzgerald | 709/223 |
| 2003/0202663 A1 | * | 10/2003 | Hollis et al. | 380/282 |
| 2003/0217039 A1 | * | 11/2003 | Kurtz et al. | 707/1 |
| 2004/0073800 A1 | * | 4/2004 | Shah et al. | 713/176 |
| 2004/0098610 A1 | * | 5/2004 | Hrastar | 713/200 |
| 2004/0117478 A1 | * | 6/2004 | Triulzi et al. | 709/224 |
| 2004/0221170 A1 | * | 11/2004 | Colvin | 713/193 |
| 2005/0138110 A1 | * | 6/2005 | Redlich et al. | 709/201 |
| 2007/0011319 A1 | * | 1/2007 | McClure et al. | 709/224 |

* cited by examiner

*Primary Examiner*—Meng-Al T. An
*Assistant Examiner*—Mark P. Francis
(74) *Attorney, Agent, or Firm*—Scully, Scott, Murphy & Presser, P.C.

(57) ABSTRACT

A software facility for evaluating and reporting security vulnerabilities on a computer network that comprises an interactive interface for a network scanner that incorporates recovery points, a health metrics facility, a status pager for mobile user notification and a reporting module for producing reports on the network's security status.

13 Claims, 6 Drawing Sheets

NETWORK SECURITY SOFTWARE

BACKGROUND OF THE INVENTION

Loss due to information-based fraud, mischief, vandalism, human error, cyber-terrorism, and both natural and man-made disasters can devastate a company financially. Information attacks directed towards corporate, and personal networks are a major threat to the evolving global economy and becoming an hourly phenomena.

Ninety percent (90%) of large companies recently surveyed reported security breaches over the past 12 months. Estimated losses amounted to more than $265 million, or nearly $1 million per organization.

Last year, Denial of Service ("DoS") attacks on each of Yahoo, CNN, eBay, Buy.com, E*Trade, and Amazon.com lasted 3-5 hours. Affected companies and peers will spend $100-$200M on infrastructure upgrades and losses related to DoS' could exceed $1 billion.

Today, corporations with e-business models face a daily barrage of information warfare tactics directed at their network infrastructures. Not only do these abuses come from malicious cyber-hackers, who strive for profit, notoriety, revenge, nuisance, but also by their own employees, vendors, suppliers, competitors, business partners, and even service providers.

Averting increasing and escalating damage during a cyber attack requires a concerted effort and cooperation from many areas within an organization and other external entities such as a Managed Service Provider (MSP), Internet Service Provider (ISP), and government or law enforcement agencies.

A secure infrastructure and security readiness will prevent most problems from occurring in the first place, and a well-planned compliance program will address the issues when cyber terrorists and hackers get past initial defenses to control, mitigate, reduce, and prevent further detrimental impact to a business.

The effectiveness of any security program is determined by what can be accomplished within a given period of time. Security is often measured by the difference between the time it takes the bad guys to get in and the good guys to lock them out.

There are numerous tools for monitoring network security and compliance purposes. These include, but are not limited to scanners such as: Security Administrators Tool for Analyzing Networks (SATAN), Security Administrator's Integrated Network Tool (Saint); as well as, Crack, nmap, nessus.

A key element in a corporation's arsenal for gaining understanding and insight as to the vulnerabilities and the risk associated with their business models, is the regular performance of security assessment. Without security assessment, a company is blind to the dangers that lie in its infrastructure. How this vulnerability information is reported is also a very important consideration due to the nature of its content.

Security assessments of computer networks have become critical for personal and commercial considerations. The proliferation of networks has led to the ubiquitous nature of connectivity we experience. With this connectivity comes the risk of exposing assets resident on the network to unwelcome intrusion and exploitation.

The increasing complexity of computer networks has made their security increasingly complex. There exist hundreds of programs intended to keep networks secure and of course hundreds of programs to crack networks.

To secure a network it is necessary to access and understand its security flaws. This is done by investigating the network's topology, by locating and probing the network's ports, fingerprinting operating systems and firewall; probing passwords as well as other techniques. Multiple tools are available for each of these and a security expert will utilize them to perform a security assessment of a network.

Among the many problems associated with conducting a security assessment are assembling, purchasing and maintaining the necessary hardware and software tools to do the job; thoroughly analyzing the data and producing an appropriate report of the results; running assessment tools without impacting the production environment's network or computers; producing data that facilitates generating different perspectives of the information; saving resources; following an accepted and rigorous process for implementing such a task; and operating in a normal office environment on an inexpensive platform. The tools required for such security audits typically include a network topology tool, a port scanner, a penetration tool, a password cracker, a report generator and a workstation.

Many tools have been provided to perform these functions individually but no tool has successfully integrated all of these functions together.

Saint™ is a tool which provides network topology and network services. It gathers its information by examining network services including NIS, and other services. Saint™ utilizes a target acquisition program that uses tcp-scan depending on whether or not the host is behind a firewall, to probe common ports testing for live hosts. Each host is then examined by a series of probes to uncover potential security flaws including incorrect setup or configured network services bugs.

NMap is a utility for security auditing that uses PCP/IP fingerprinting to determine what hosts, ports, operating systems, packet filters and firewalls are in use on a network. NMap utilizes port scanning, OS detection, ping-sweeps and many other techniques for mapping a network.

Crack is a password guessing program designed to locate weak login passwords on a UNIX based network.

YPX is a utility for transferring a network map from a host. To accomplish this, YPX can also guess the NIS domainname of the remote host.

While all of these tools are useful, none perform all of the desired tasks of a security audit. Each tool produces its own outcomes which do not integrate easily with other tools. Each tool requires its own administration. To operate each tool individually requires great resources including time and labor.

SUMMARY OF THE INVENTION

The present invention includes a customization of third party security metrics and reporting technology products to address the vulnerability assessment and reporting requirements and needs of a company. This facility includes elements for IP space mapping, port scanning, HTML generation and tabular report generation and distribution, information access control, auditing, compliance spot-checks, and other ancillary functions.

Regular security policy compliance monitoring is useful for determining the level of effort being expended, and the degree of success a security remediation program is achieving. This process requires using a facility that provides countermeasure evaluations of systems that were known to have security issues without the need to re-scan an entire environment. The present invention provides this capability. The invention executes exploit scripts using its vulnerability databases to spot check once-vulnerable systems to quickly determine if those systems are still at risk.

The invention also includes a facility for the creation of web accounts for access to the facility's content such as its security vulnerability reports in HTML format. The invention's administration function provides a robust and comprehensive tool-set for administration of:

Owner's Account Identification: user name and other demographic information such as telephone number, department, location, city, state, zip, area of responsibility, login name, password, login restriction—by fixed static IP address.

User Accounts—maintains parameters within the account profile: department, location, telephone number, IP Address, and password.

Delete Web Account—deletes the account from the facilities Access Control List.

Idle User Maintenance—creates reports and e-mail notifications when a facility resource has been idle for an unacceptable duration of inactivity.

Maintenance of notification lists for e-mail and pager alerts.

Full system backups and restores.

The present invention is a software facility for network enterprise security vulnerability assessment and resolution. This software facility utilizes security tools or parts of these tools such as, but not limited to: Satan, Saint, nmap, Sara, Apache, and Crack. The present invention contains many security exploits and metric generating utilities to provide a complete and robust facility for implementing a security monitoring and compliance program.

The present invention provides cost effective security assessment and is run in production without impact. It also provides security compliance metrics including, but not limited to statistical, demographic, and resource requirements.

The software facilitates the ability to remediate vulnerabilities by assisting systems support areas with the ability to quickly find and identify their areas of concern. It saves the data security and systems support department's resources and provides the means to present mission critical graphs, statistics, and resource requirements for budgeting purposes to support proper business alignment with company remediation objectives.

The invention is a platform independent, fully-automated security audit, assessment and reporting facility. It also provides a web site that facilitates remediation.

It is an integration of security analysis and exploitation programs, web-based security documentation, hyper-linked tutorials, management programs, URLs, tools, references, security metrics, and customer content.

The facility performs the tasks of a security assessment professional in a fully-automated fashion to provide maximum efficiency of the data security resources. It combines all the necessary programs that are required to safely obtain the most amount of vulnerability information needed for a comprehensive remediation program and contains a full set of tools to manage the facility, assessments, and data. It also provides valuable URLs, research tools, and security references to help assist with remediation of vulnerabilities and understand the security environment, and provides the means to publish security health metrics for measuring progress towards security policy compliance.

It can be tailored to the customer's content for an appropriate "look and feel", for example: data classification banners on the security reports.

With the present invention, multiple tasks can be performed and their results integrated in a highly efficient manner. Once the tools are assembled, they are integrated for running efficiently. Once they are integrated for running, their outcomes are drawn together into a cohesive report.

A method for evaluating and reporting security vulnerabilities on a computer network is disclosed. The invention comprises scanning the nodes of a network for vulnerabilities such as open or accessible ports, crackable passwords and flawed firewalls. This scanning and its results are displayed in an interactive interface and reported in reports.

The invention includes notifying an administrator of a predetermined event by mobile pager, telephone, e-mail or other means. A predetermined event can be an unauthorized intrusion, the start or stop of a scan, or the status of a server. It maintains an independent domainname system for integrating various domainname systems, such as Windows Naming System, to IP addresses.

DETAILED DESCRIPTION

The features of the present invention may comprise a Web facility, a network scanner, security health metrics report, security awareness demonstrations, vulnerability tutorials, useful URLs, a compliance verification security research tool, paging services and reporting tools; the software that implements the present invention may reside on any Linux compatible networked computer or server or network appliance.

The Web interface provides a centralized reporting facility for the scanner. The Web based health metrics reporter provides a user with identification and control over user accounts. User accounts may include user names, telephone numbers, responsibilities, clearance levels and other information by fixed static IP address. Also provided are the status logs and reports generated by the scanner.

The scanner is the primary operating facility of the invention. The scanner provides a node by node topographical scan of a designated network or an entire enterprise network architecture. The scanner tests the networks vulnerabilities by querying ports, attempting to crack passwords, and probing firewalls and through firewalled networks. Any suitable scanner may be used. The facility has a job controller that can control the scanner. The job controller logs each subnet scanned and is able to define an entire enterprise scan. Once an enterprise scan has been defined, any subsequent scans can be compared on a node by node basis. This provides the invention the ability to utilize recovery points i.e. a recoverable/restart capability. Ad-hoc investigations are provided by this capability.

Figure 1:
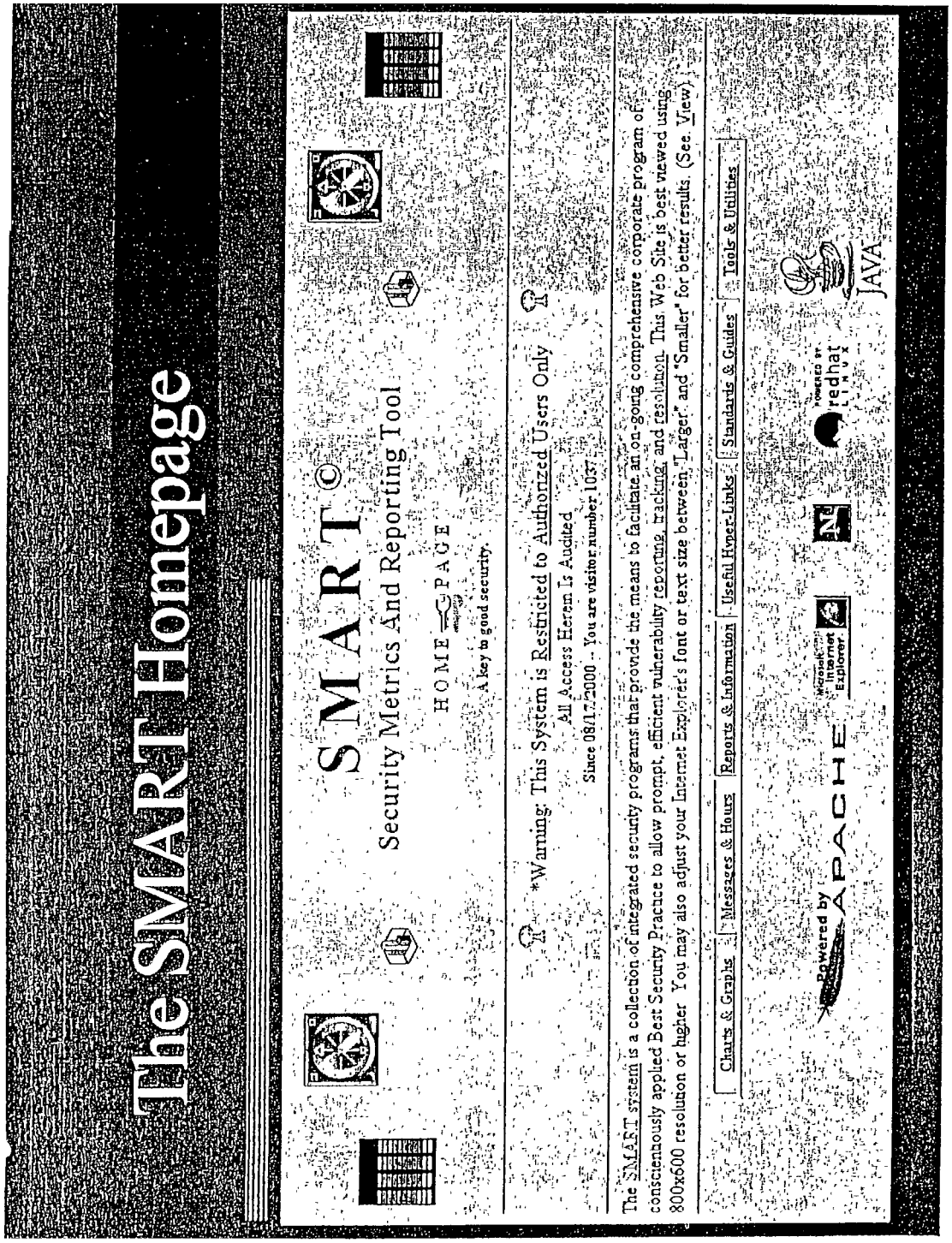
FIG. 1 is a screen capture of a generic web interface home page of the invention.

FIG. 1 is a web page screen capture of a generic homepage of the web based health metrics reporter. While the reporter does not have to be Web based, it is the preferred embodiment.

Figure 2:
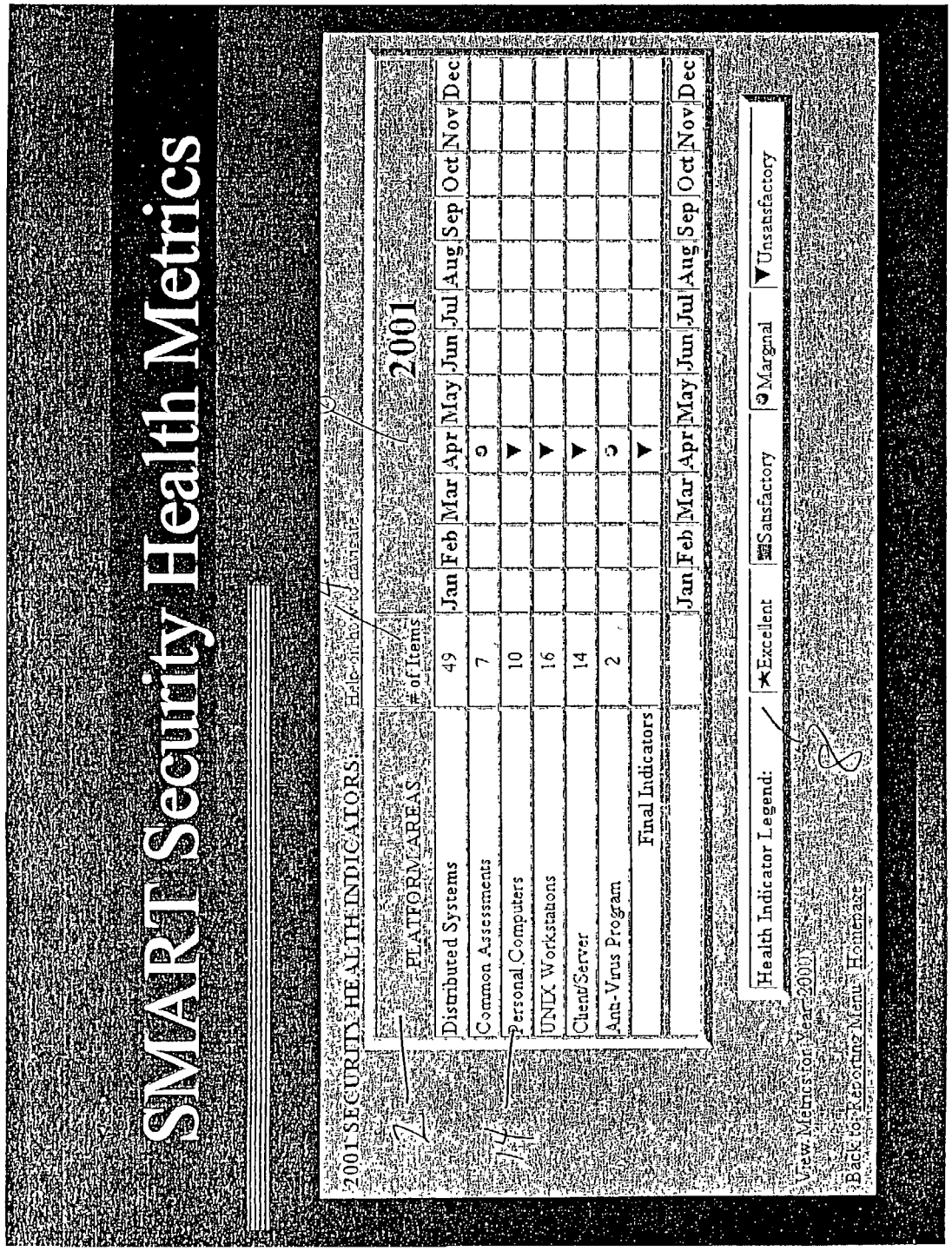
FIG. 2 is a screen capture of a health metrics report.

FIG. 2 is a screen capture of a typical health metrics report from the web facility. This report indicates the platforms for which metrics were tracked 2 in the first column. The platforms include personal computers, UNIX workstations and an anti-virus program.

In column 2 of FIG. 2, the number of items or criteria that make up each metric is indicated 4. For example, 10 criteria were used for personnel computers and 16 for UNIX workstations.

Column 3 indicates the month the analyses were performed 6. In this example each platform area was analyzed in April of 2001.

The metrics associated with each platform is also displayed. In the "April" column of 6 the health of each platform area is quantified as either excellent satisfactory, marginal or unsatisfactory as indicated by the legend 8. So, for instance, the overall security health of the UNIX workstations is unsatisfactory based on the tools analyses.

Figure 3:
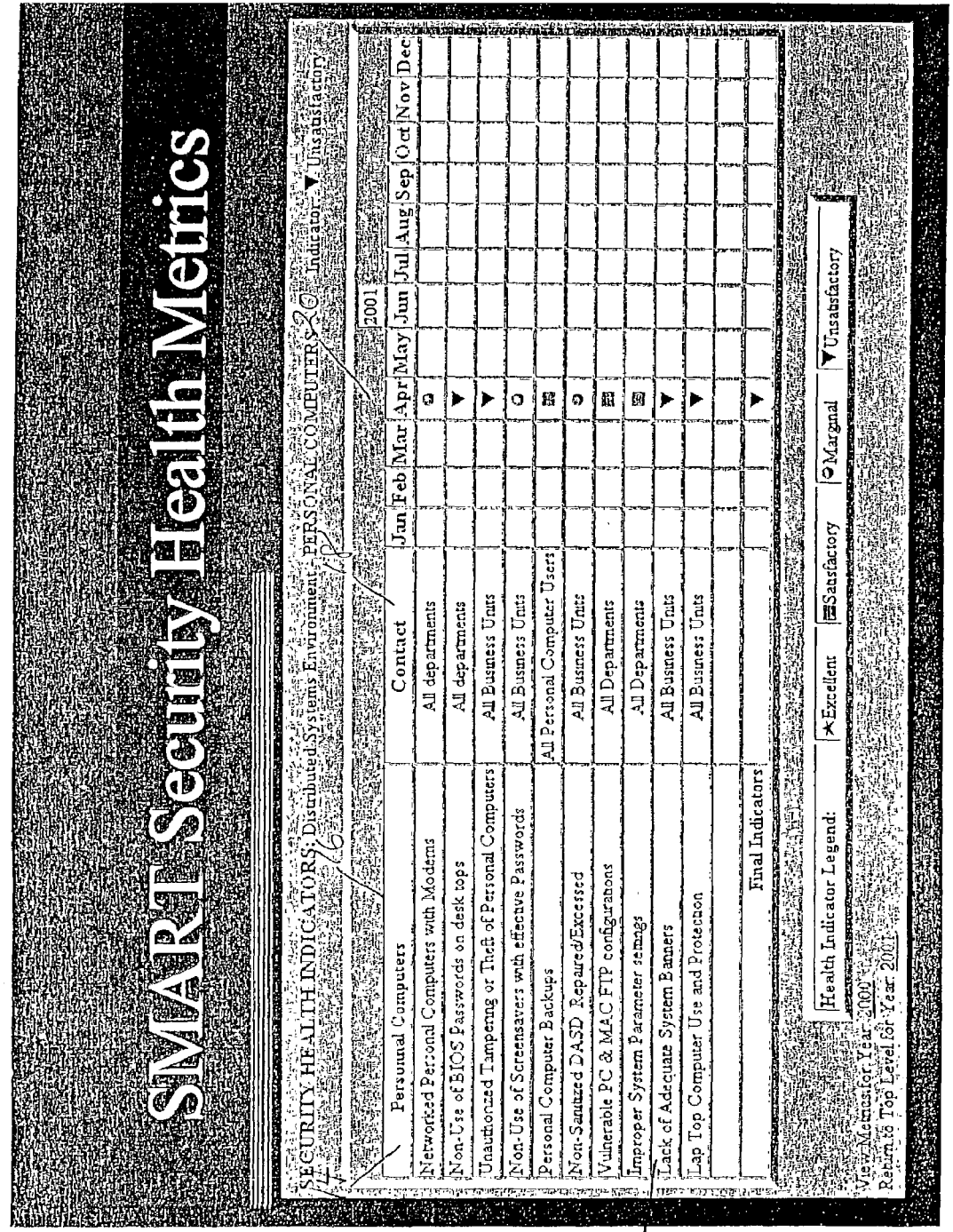
FIG. 3 is a drilled down screen capture of FIG. 2.

Each metric is a hyperlink that drills down to the specific item's status. FIG. 3 depicts the "personal computers" platform from FIG. 2 in a more detailed chart and drilled down one level. The invention has the ability to drill down several layers into the results to depict more detailed data from an analysis.

In FIG. 3 "personal computers" 14 is broken down into several different categories as characterized by the analysis tools in the first column 16. These include networked personal computers, non-use of passwords and lack of adequate system banners. The second column indicates the contact information for each individual category 18. Hence, FIG. 3 is a report of a scan which analyzed personal computers on a network for security vulnerabilities such as no password protection or lack of warning banners. The facility provides a banner filter that checks for banner compliance regarding proper wording.

The third column of FIG. 3 indicates the month and year of the assessment 20. Again the legend defines the quantification of the metric.

Figure 4:
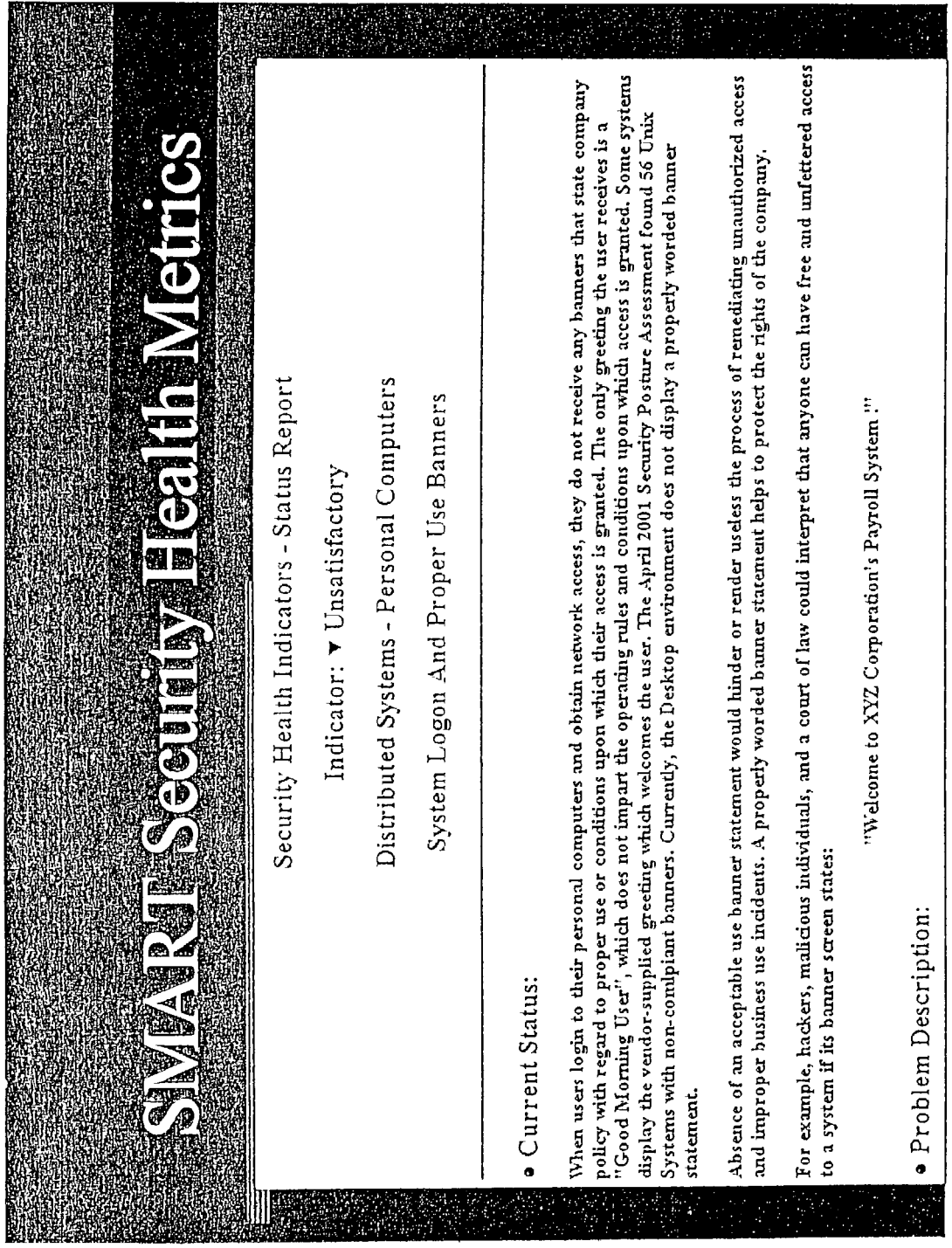
FIG. 4 is a screen capture of a status report as part of the health metrics facility.

A screen capture of an example of a status report from the security health metrics reporter as depicted on the inventions web facility is shown in FIG. 4. The current status of an item is reached by clicking on the item's status metric to drill down into it. This status report explains the status of the use of system banners on personal computers as displayed from FIG. 3 26. Generally, the current status provides the latest information on that item, a description of why this item is a problem, the criticality of the item, a recommended solution, the resources that should address the problem and resources for additional information including URLs.

Figure 5:
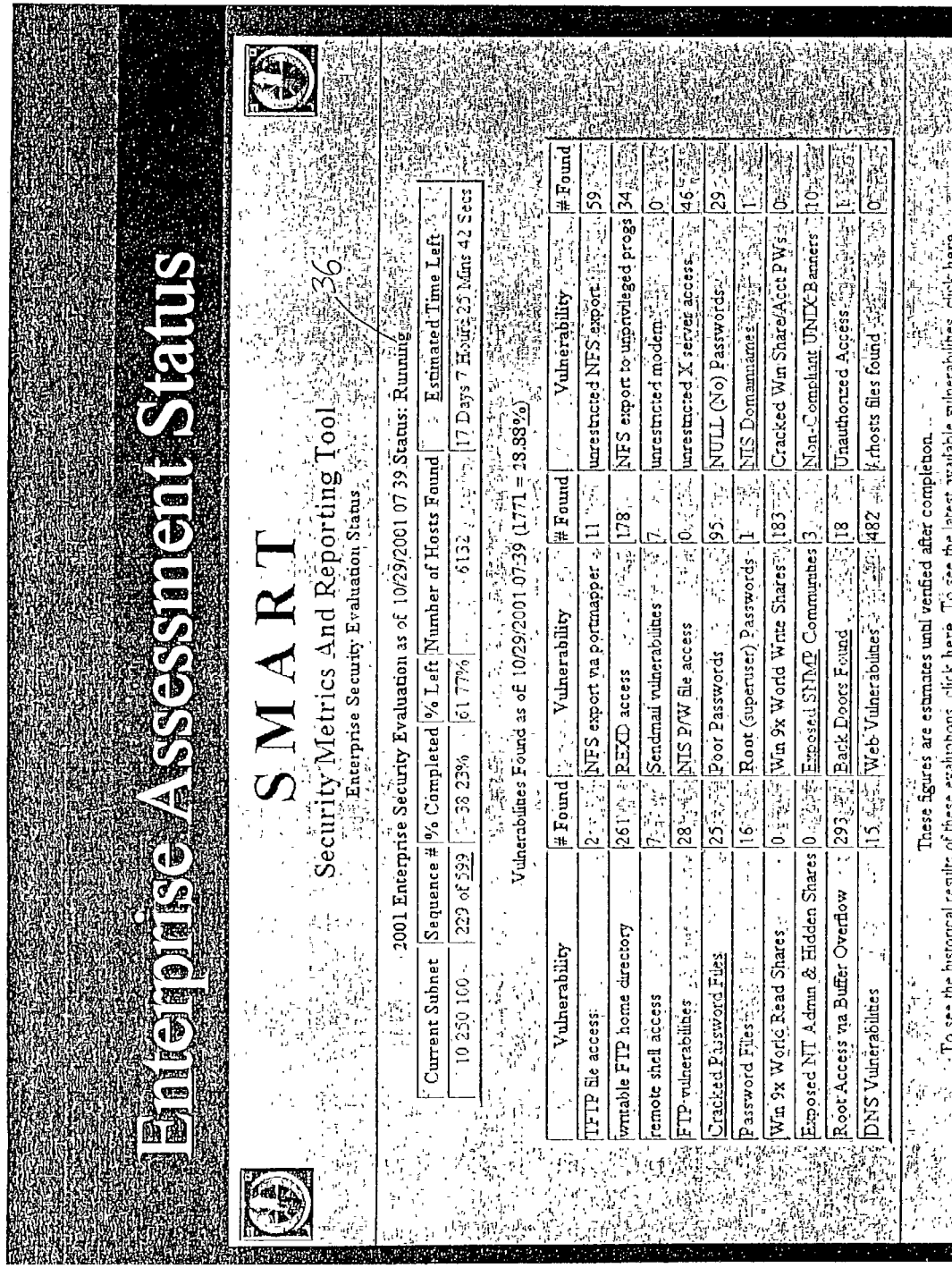
FIG. 5 is a screen capture of the web based health metrics facility.

FIG. 5 is a screen capture from the web facility of an enterprise security evaluation health metrics report. During an enterprise assessment, support personal can check the status of the analysis being performed. The invention provides a near real-time status page that allows users to get the status of a job or which network is currently being evaluated. Some vulnerability statistics are provided on this page and the page has hyperlinks to drill down for further vulnerability information.

The lower rows of the chart reports on the vulnerabilities found by the present scan. For example 25 password files were cracked by the systems password cracker, 18 backdoors were found and 482 web vulnerabilities. Further information includes, hosts with non-compliant logon banners, the network assessment order, discovered NIS domainnames, and SNMP community string vulnerabilities.

Figure 6:
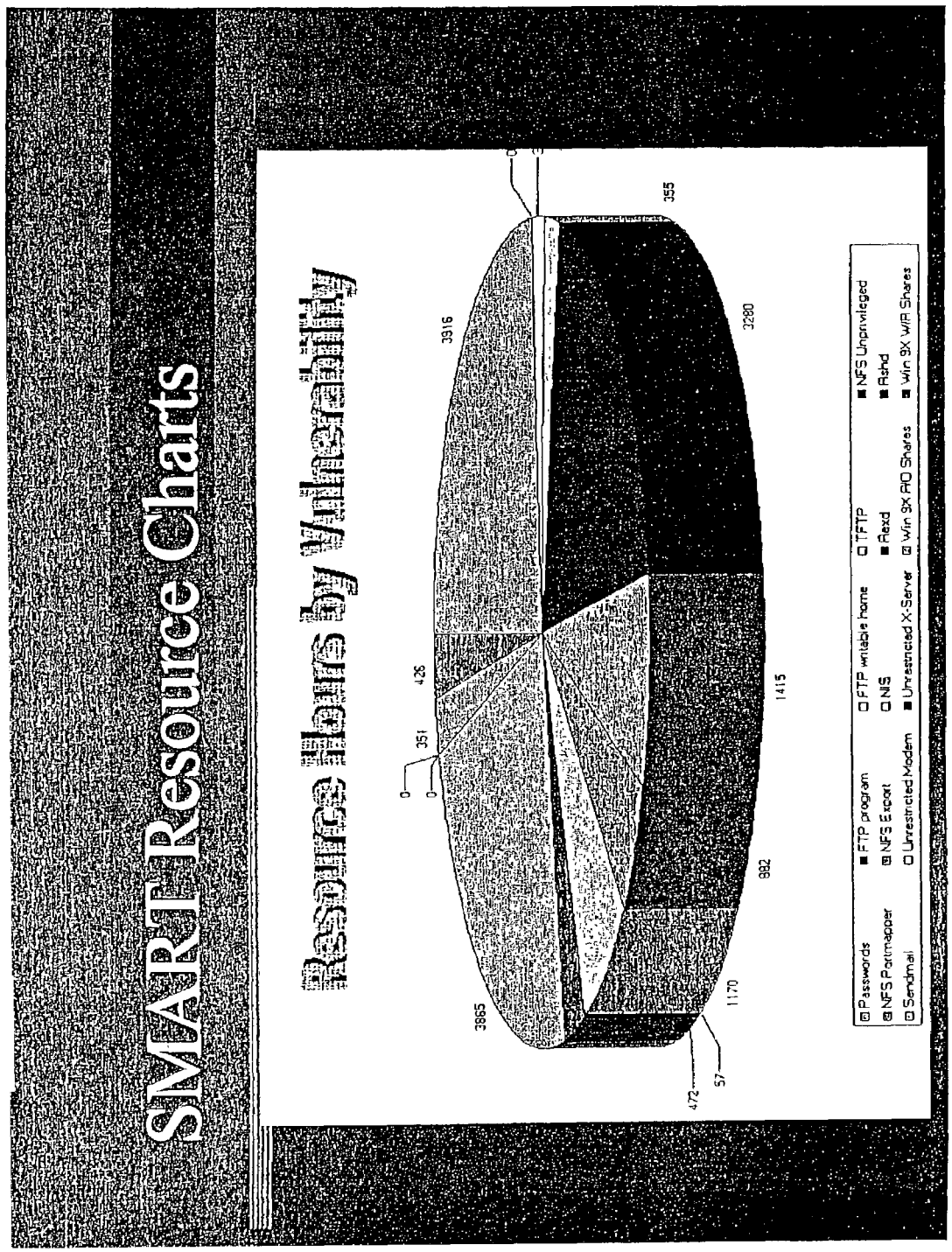
FIG. 6 is a screen capture of a vulnerability report page.
Figure 1:
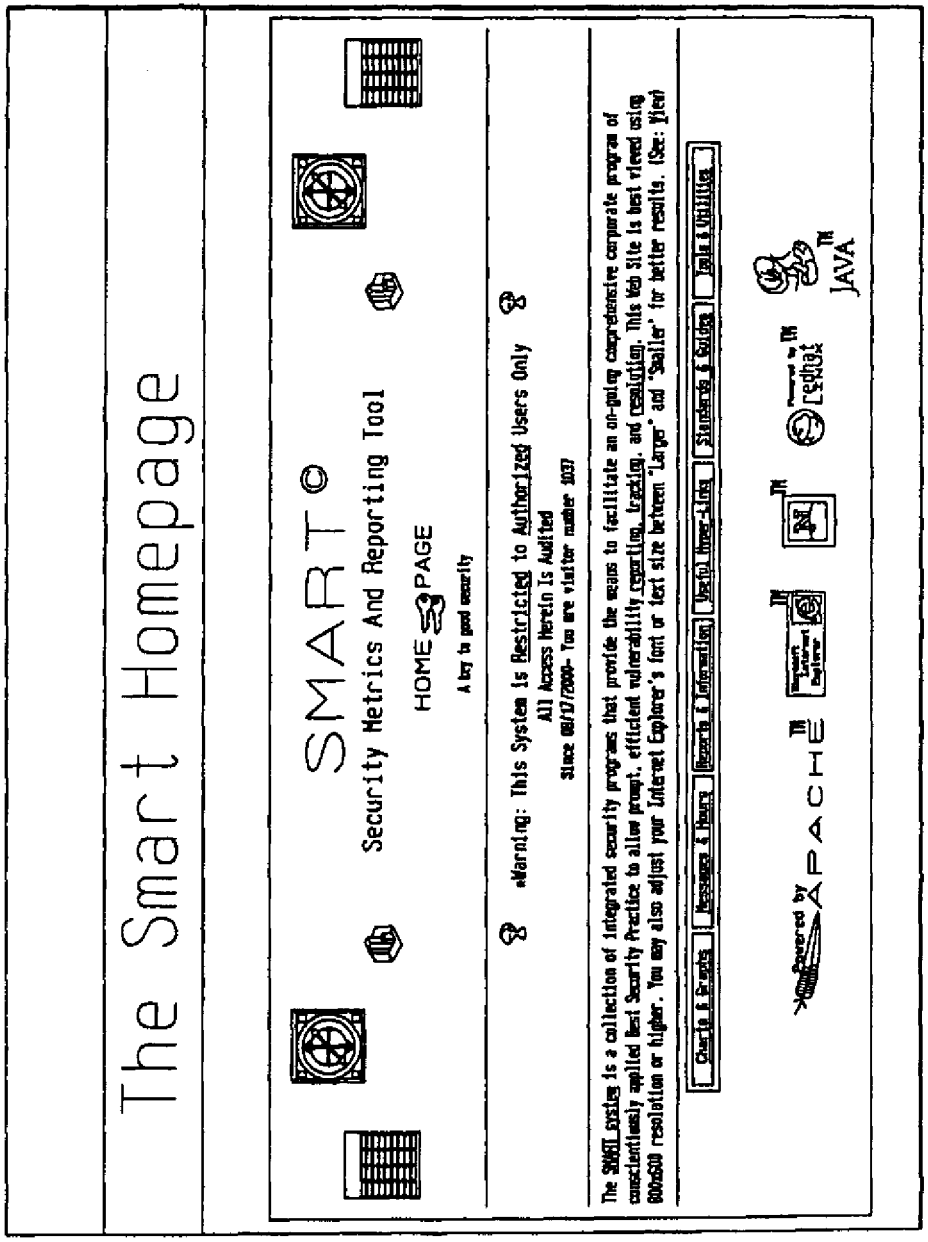
Figure 2:
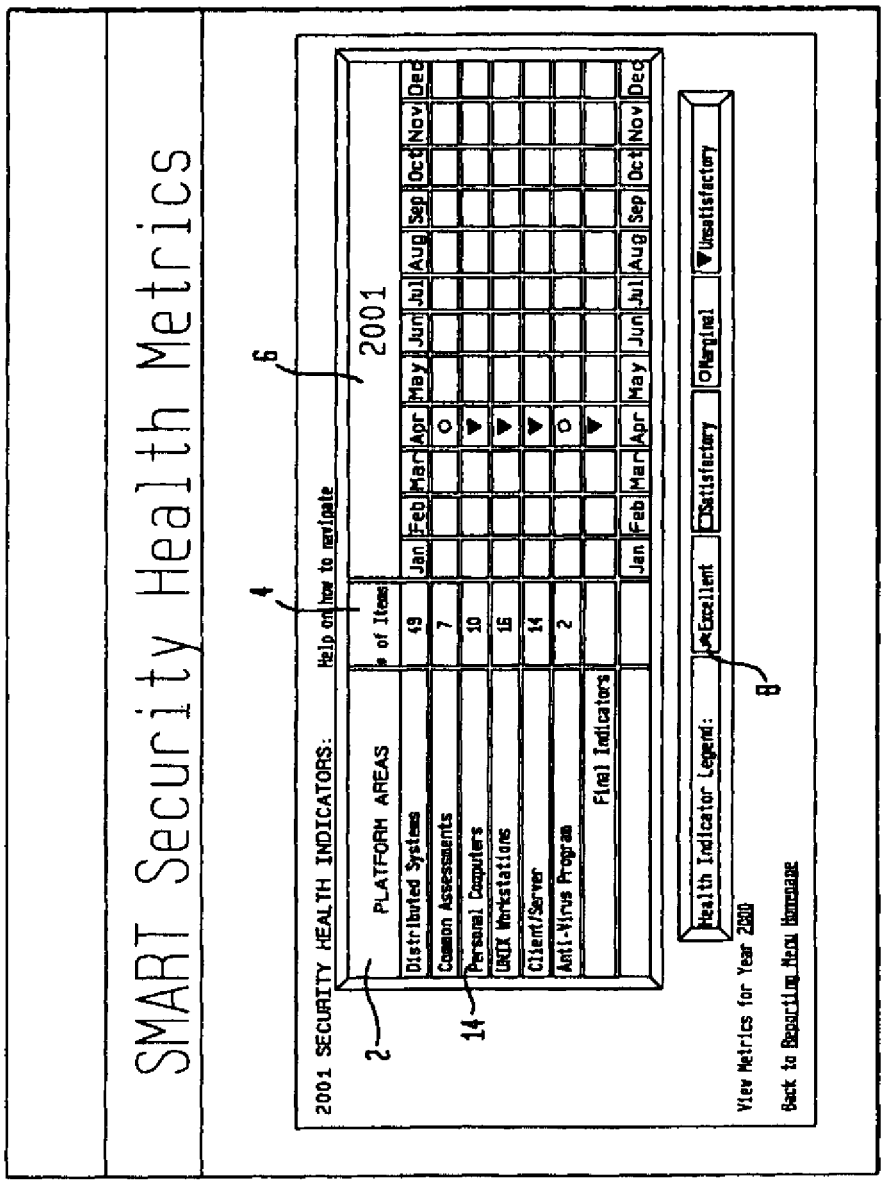
Figure 3:
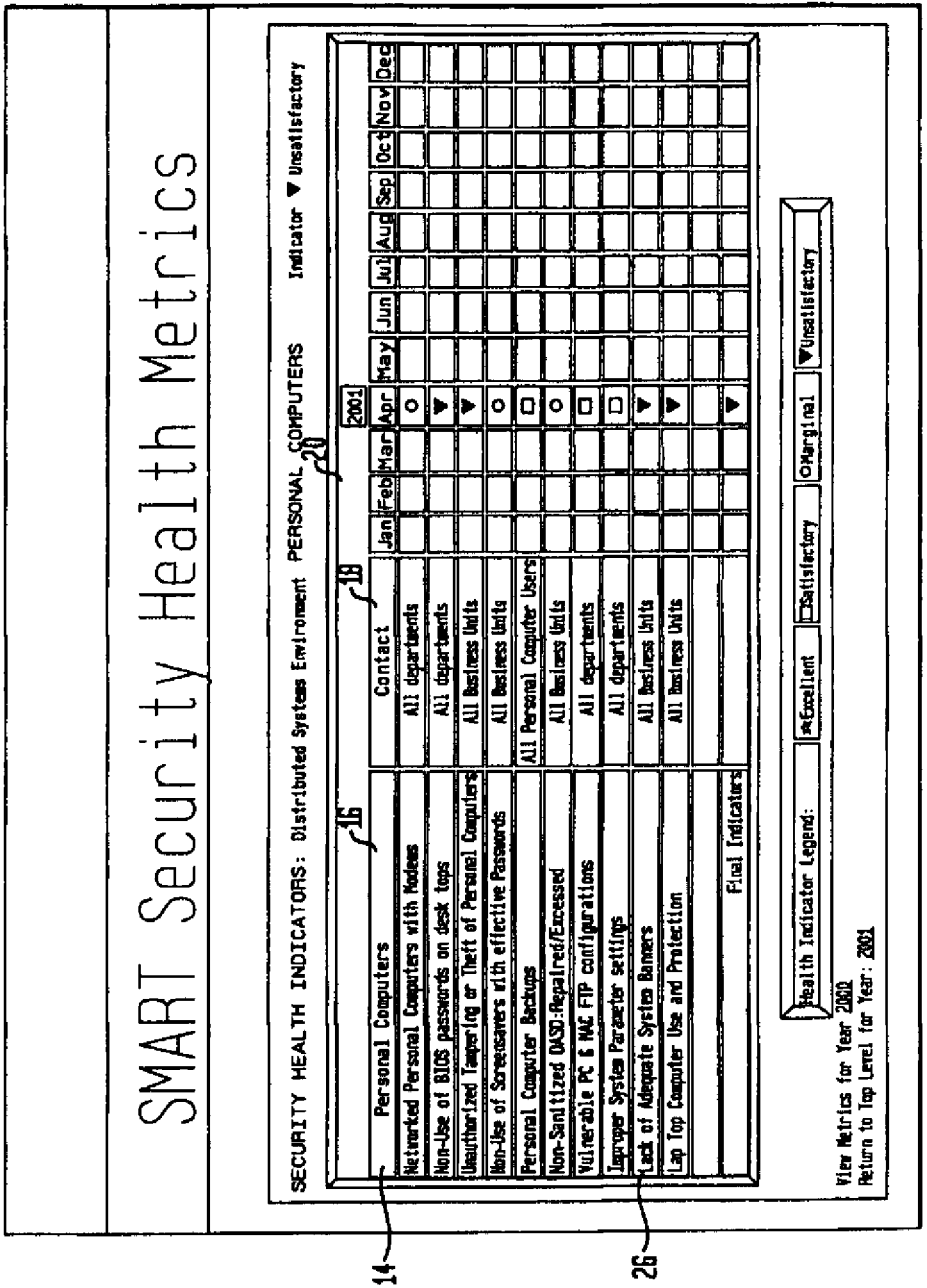
Figure 5:
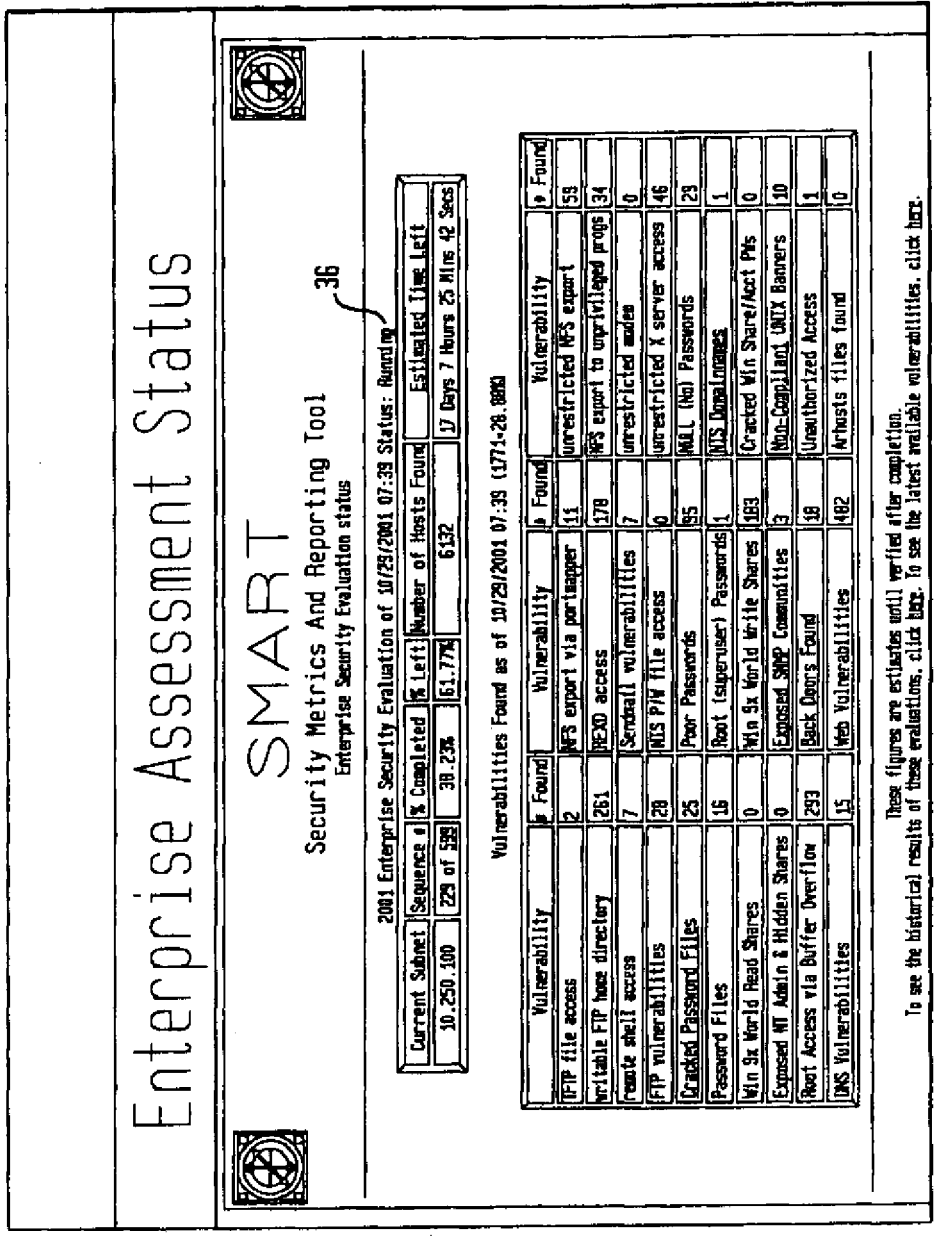
Figure 6:
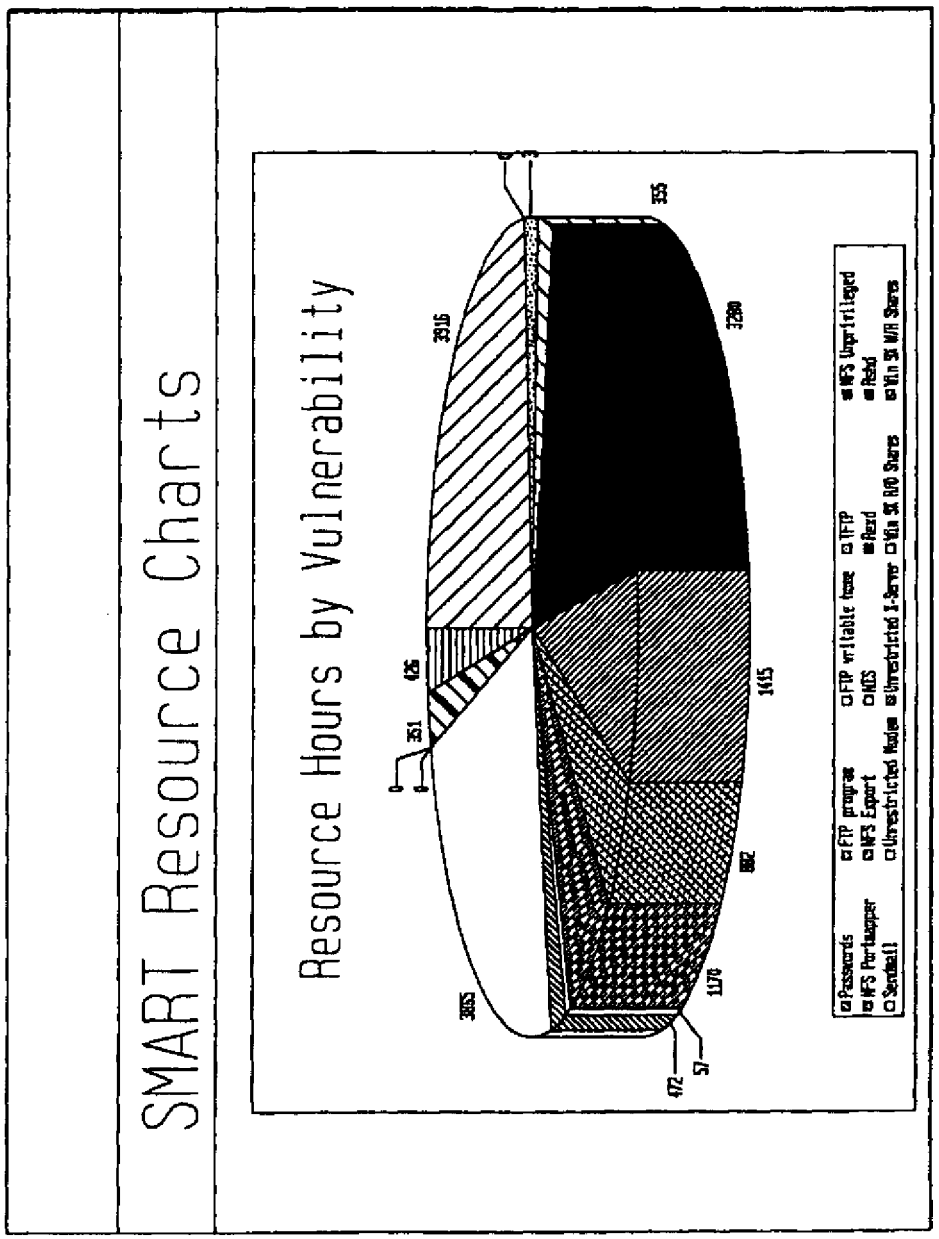

This information may be formatted in a number of different ways including graphically. FIG. 6 is a pie chart created by the invention depicting the resource hours necessary to fix a vulnerability by vulnerability. Resource charts show how much labor or dollars are needed for security remediation. Resource demographic bar charts show how much labor is required by geographic location and where best to apply these resources.

Health metrics report on remediation progress and the state of the network. The facility provides numerous ways to present the data. Security awareness demonstration scripts allow security personnel to conduct security seminars. Vulnerability tutorials provide support staff valuable information needed to understand, obtain program patches, and remediate the problems quickly and correctly.

The facility provides an environment from which to conduct ad-hoc investigations, data gathering and reporting.

In addition, the facility comprises a notification alert and paging system, built-in host intrusion detection system ("IDS") a job controller and scheduler, security intrusion scripts (Read-Only exploits), an IP to Hostname Translator (RARP DNS/WINS), and PVCS version control interface.

The job controller controls the action and integration of the tools of the facility. The job controller provides for operation of the recovery points. The controller also allows a user to waive a particular vulnerability and provides for tracking all waivers. The waivers may be assigned expiration dates which may also be tracked.

The notification tool alerts key personnel on a variety of events such as the initiation of a security assessment, the scanning of a particular network, idle use or the initiation of a system start-up.

The built-in IDS notifies an administrator if an intrusion attempt is made on the facility.

The applications are controlled by the invention's job controller which has a scheduling system that operates the facilities based upon company and operational requirements.

The intrusion routines of the scanner obtain password files in a read-only method and will never write data to the target systems to effect an exploit.

The facility maintains its own internal DNS system for joining separate or independent company Domain Name System and Windows Naming System computer names to their corresponding IP addresses providing a more reader-friendly reporting capability.

The Program Versioning Control System ("PVCS") allows the facility administrator to bundle the system into a "tar-ball" for storage in a commercial PVCS where it may be required by company processes. The PVCS automates revisions and version control to make the facility more reliable and accurate. Also included are installation and download programs, update distribution and synchronization programs, databases, tape backup and restore programs.

The facility provides its administrator with the ability to quickly install it on additional machines through the click of a browser. A tape backup facility allows data back-up and restoring in case of a system crash or mistake.

Utilities are provided that allow the creation of new data and the ability to generate ad-hoc reports and reporting applications. Also, the invention automatically manages password and other data it obtains from its targets.

The invention takes the data from its various integrated tools and stores the data in a common format. This stored data provides for quick compliance checks and avoids scanning an entire environment. Hosts with a particular concern can be quickly identified and checked for that concern.

While the present invention has been particularly shown and described with respect to preferred embodiments, it will be understood by those skilled in the art that the foregoing and other changes in form and detail may be made without departing from the spirit and scope of the present invention. It is intended that the present invention not be limited to the exact forms and details described and illustrated, but include those that fall within the spirit and scope of the appended claims.

The invention claimed is:

1. A software facility for evaluating and reporting security vulnerabilities on a computer network having nodes, each node performing one or more production tasks, said facility comprising:
   a network scanner incorporating recovery points providing a restart capability, said scanner further comprising password intrusion routines obtaining password files using read-only methods;

a web based health metrics reporter;

a status pager for mobile user notification; and a job controller, providing for waiving a predetermined vulnerability and tracking all waivers, whereby said scanner, said reporter and said pager are controlled, wherein said job controller scans a node without impacting the one or more production tasks of said node, said status pager indicates a scanner status, a server status and an intrusion.

2. A software facility as in claim 1 further comprising:
a notification tool for prompting a user of an event.

3. A software facility as in claim 1 wherein:
the health metrics facility is web based.

4. A software facility as in claim 1 wherein:
the job controller provides for expiration of waivers.

5. A software facility as in claim 1 further comprising:
means to automatically update an IP address to correspond to a particular user.

6. A software facility as in claim 1 further comprising:
a program versioning control system.

7. A software facility as in claim 1 further comprising:
automated tutorials.

8. A software facility as in claim 1 further comprising:
an intrusion detection system.

9. A software facility as in claim 1 further comprising:
means for maintaining its own internal domainname system for joining other domainname systems to their corresponding IP addresses.

10. A software facility as in claim 1 further comprising:
a banner filter.

11. A method for evaluating and reporting security vulnerabilities on a computer network comprising:
scanning the nodes of a network for vulnerabilities with a scanner that incorporates recovery points providing a restart capability, said scanner comprising password intrusion routines obtaining password files using read-only methods;
reporting the operation and results of the scanning;
providing mobile notification of predetermined events; and
maintaining an independent domainname system for joining domainname systems to the corresponding IP addresses, and providing for waiving a predetermined vulnerability and tracking all waivers, wherein said reporting includes indicating a scanner status, a server status and an intrusion.

12. A method for evaluating and reporting vulnerabilities as in claim 11 further comprising:
automatically providing tutorials on a particular vulnerability to user.

13. A software facility for evaluating and reporting security vulnerabilities on a computer network having nodes, each node performing one or more production tasks, said facility comprising:
a network scanner incorporating recovery points providing a restart capability, said scanner comprising password intrusion routines obtaining password files using read-only methods;
a Web based health metrics reporter;
a status pager for mobile user notifications;
a job controller whereby said scanner, said reporter and said pager are controlled, said job controller providing for waiving a predetermined vulnerability and tacking all waivers;
a program versioning control system;
an intrusion detection system; and
a banner filter for assessing banner compliance regarding proper wording, wherein said job controller defines an enterprise scan and scans a node without impacting the one or more production tasks of said node, and said status pager indicates a scanner status, a server status and an intrusion.

* * * * *

UNITED STATES PATENT AND TRADEMARK OFFICE
CERTIFICATE OF CORRECTION

PATENT NO.        : 7,350,203 B2
APPLICATION NO.   : 10/201430
DATED             : March 25, 2008
INVENTOR(S)       : Alfred Jahn It is certified that error appears in the above-identified patent and that said Letters Patent is hereby corrected as shown below:

The title page showing the illustrative figure should be deleted to be replaced with the attached title page.

The drawing sheets, consisting of Figs. 1-6, should be deleted to be replaced with the drawing sheets, consisting of Figs. 1-6, as shown on the attached pages.

Signed and Sealed this

Ninth Day of February, 2010

David J. Kappos
*Director of the United States Patent and Trademark Office*

(12) United States Patent
Jahn

(10) Patent No.: US 7,350,203 B2
(45) Date of Patent: Mar. 25, 2008

(54) NETWORK SECURITY SOFTWARE

(76) Inventor: Alfred Jahn, 25-10 124th St., Flushing, NY (US) 11354

( * ) Notice: Subject to any disclaimer, the term of this patent is extended or adjusted under 35 U.S.C. 154(b) by 581 days.

(21) Appl. No.: 10/201,430

(22) Filed: Jul. 23, 2002

(65) Prior Publication Data

US 2004/0019803 A1    Jan. 29, 2004

(51) Int. Cl.
   *G06F 9/44* (2006.01)
(52) U.S. Cl. ............ 717/171; 717/175; 713/200; 713/201; 713/202
(58) Field of Classification Search ........ 713/200-201, 713/202; 709/231, 201, 224; 705/14; 707/1; 380/282; 726/25; 717/174, 176, 171, 175; 340/7.26

See application file for complete search history.

(56) References Cited

U.S. PATENT DOCUMENTS

| | | | | |
|---|---|---|---|---|
| 5,369,682 | A * | 11/1994 | Witsaman et al. | 340/7.26 |
| 5,764,897 | A * | 6/1998 | Khalidi | 709/201 |
| 6,185,689 | B1 * | 2/2001 | Todd et al. | 726/25 |
| 6,298,445 | B1 * | 10/2001 | Shostack et al. | 726/25 |
| 6,332,163 | B1 * | 12/2001 | Bowman-Amuah | 709/231 |
| 2003/0056116 | A1 * | 3/2003 | Bunker et al. | 713/201 |
| 2003/0140140 | A1 * | 7/2003 | Lahtinen | 709/224 |
| 2003/0163370 | A1 * | 8/2003 | Chen et al. | 705/14 |
| 2003/0191830 | A1 * | 10/2003 | Fitzgerald | 709/223 |
| 2003/0202663 | A1 * | 10/2003 | Hollis et al. | 380/282 |
| 2003/0217039 | A1 * | 11/2003 | Kurtz et al. | 707/1 |
| 2004/0073800 | A1 * | 4/2004 | Shah et al. | 713/176 |
| 2004/0098610 | A1 * | 5/2004 | Hrastar | 713/200 |
| 2004/0117478 | A1 * | 6/2004 | Triulzi et al. | 709/224 |
| 2004/0221170 | A1 * | 11/2004 | Colvin | 713/193 |
| 2005/0138110 | A1 * | 6/2005 | Redlich et al. | 709/201 |
| 2007/0011319 | A1 * | 1/2007 | McClure et al. | 709/224 |

* cited by examiner

*Primary Examiner*—Meng-Al T. An
*Assistant Examiner*—Mark P. Francis
(74) *Attorney, Agent, or Firm*—Scully, Scott, Murphy & Presser, P.C.

(57) ABSTRACT

A software facility for evaluating and reporting security vulnerabilities on a computer network that comprises an interactive interface for a network scanner that incorporates recovery points, a health metrics facility, a status pager for mobile user notification and a reporting module for producing reports on the network's security status.

13 Claims, 6 Drawing Sheets

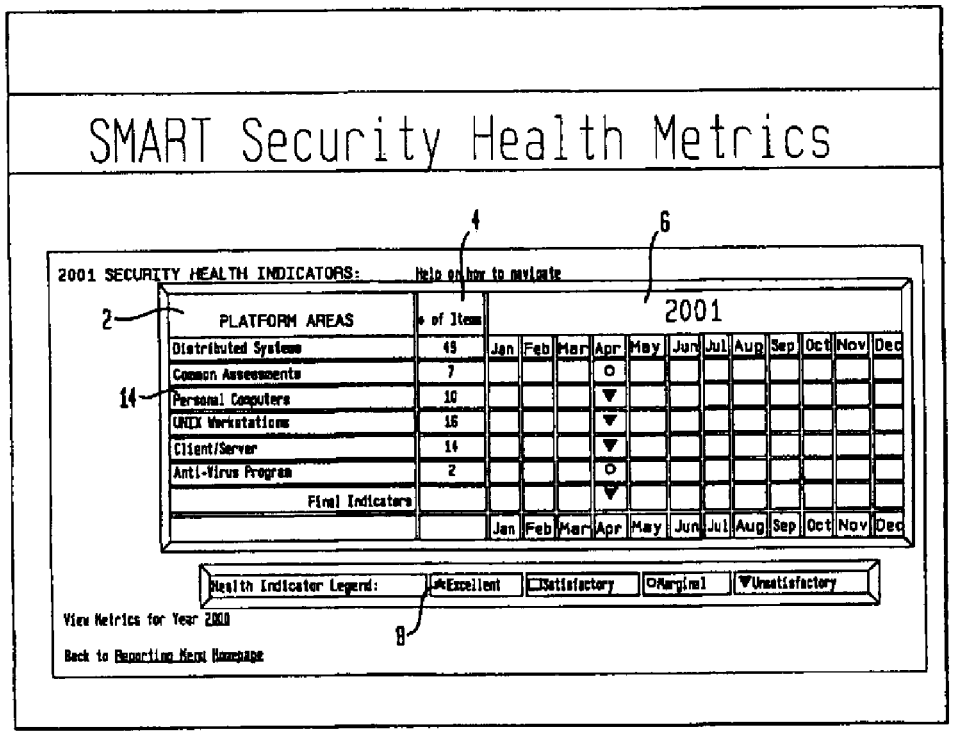

FIG. 4

SMART Security Health Metrics

Security Health Indicators- Status Report

Indicator: ▼Unsatisfactory

Distributed Systems- Personal Computers

System Logon And Proper Use Banners o Current Status:

When users login to their personal computers and obtain network access, they do not receive any banners that state company policy with regard to proper use or conditions upon which their access is granted. The only greeting the user receives is a "Good Morning User", which does not impart the operating rules and conditions upon which access is granted. Some systems display the vendor-supplied greeting which welcomes the user. The April 2001 Security Posture Assessment found 56 Unix Systems with non-compliant banners. Currently, the desktop environment does not display a properly worded banner statement.

Absence of an acceptable use banner statement would hinder or render useless the process of remediating unauthorized access and improper business use incidents. A properly worded banner statement helps to protect the rights of the company.

For example, hackers, malicious individuals, and a court of law could interpret that anyone can have free and unfettered access to a system if its banner screen states:

"Welcome to XYZ Corporation's Payroll System !"

o Problem Description: